United States Patent [19]

Fischer et al.

[11] Patent Number: 5,794,505
[45] Date of Patent: Aug. 18, 1998

[54] POSITIONING DRIVE, IN PARTICULAR FOR A MACHINE TOOL

[75] Inventors: Günter Fischer, Gemünden; Rainer Knöll, Burgsinn, both of Germany

[73] Assignee: Mannesmann Rexroth AG, Lohr/Main, Germany

[21] Appl. No.: 776,639

[22] PCT Filed: Jun. 24, 1995

[86] PCT No.: PCT/EP95/02467

§ 371 Date: Jan. 21, 1997

§ 102(e) Date: Jan. 21, 1997

[87] PCT Pub. No.: WO96/03586

PCT Pub. Date: Feb. 8, 1996

[30] Foreign Application Priority Data

Jul. 22, 1994 [DE] Germany ............... 44 26 032.6

[51] Int. Cl.$^6$ .................................................. F15B 15/26
[52] U.S. Cl. ........................................... 91/41; 91/448
[58] Field of Search ............................. 91/525, 526, 536, 91/392, 410, 189, 194, 448, 41

[56] References Cited

FOREIGN PATENT DOCUMENTS

| | | |
|---|---|---|
| 2349099 | 4/1975 | Germany . |
| 3840328 | 5/1990 | Germany . |
| 4011593 | 10/1991 | Germany . |
| 4345165 | 10/1994 | Germany . |
| 4312581 | 11/1994 | Germany . |

OTHER PUBLICATIONS

Patent Abstracts of Japan, vol. 10 No. 304 (M–526) Oct. 16, 1986 & JP.A.61 117039 (Toshiba) Jun. 4, 1986, JP.U.62 195 435 (None) Dec. 12, 1987.

*Primary Examiner*—Thomas E. Denion
*Assistant Examiner*—Bijan N. Karimi
*Attorney, Agent, or Firm*—Martin A. Farber

[57] ABSTRACT

A positioning drive having a hydraulic motor with a cam disc which is rotatable with a motor shaft and has a cam, a control valve which, with the hydraulic motor forms a unit with a housing and has a valve piston which is displaceable between several positions, a control element via which the valve piston can be supported on the cam disc, and an adjustment element which is operatively disposed between the control element and the valve piston and coaxial to the latter. The relative position between the valve piston and control element is variable by relative adjustment of the adjustment element with respect to the valve piston. The position of the adjustment element relative to the valve piston is securable by a releasable locking element. The outer of the two parts, valve piston and adjustment element, is guided outwards through the housing, and the locking element is accessible externally of the housing.

9 Claims, 4 Drawing Sheets

POSITIONING DRIVE, IN PARTICULAR FOR A MACHINE TOOL

FIELD AND BACKGROUND OF THE INVENTION

The present invention concerns from a positioning drive which is used, in particular, on machine tools and which has the features set forth in the preamble of the independent claim.

Such a positioning drive is used, in particular, in order to bring a machine part for which several different positions are preferably possible, into a given position. The machine part can, for instance, be a multi-spindle turret of a boring machine or a tool holder of a machine having several machining stations.

A positioning drive having the features introductory-mentioned is known from the Japanese utility model application published under 62/195435. In that positioning drive, the housing part of the control valve is fastened to the housing part of the hydraulic motor in such a manner that the axis of the valve piston extends perpendicular and tangential to the axis of the motor shaft. The control element is a double-arm lever which is so mounted in the motor housing that it is swingable around an axis which extends parallel to the motor shaft. At the end of the one lever arm, the control element can act on the cam on the cam disk which is fastened, fixed for rotation, on the motor shaft, the lever arm extending approximately perpendicular to a radius vector between the axis of the motor shaft and the place of contact between cam disk and control element. At the end of the other lever arm, the control element grips in fork-shaped manner around a setting element which is fastened to the valve piston. The setting element is developed as a bushing which has, on its outer side, two driver pins which are located diametrically opposite each other and which are gripped around by the control element, the bushing being screwed by an internal thread on a section of the valve piston which is provided with an external thread. The relative position between valve piston and setting element is secured by means of a lock nut.

Another positioning drive is known from Federal Republic of Germany AS 23 49 099. In that positioning drive, the control element is a control bolt which is developed in one piece with the valve. Control bolt and valve piston are movable radially with respect to the cam disk. Finally, in the senior German Patent Application P 43 12 581.6 a positioning drive is described in which a control piston and a valve piston are arranged, also aligned with each other, radially to the cam disk. Control piston and valve piston are to be sure two separate parts.

In the positioning drives indicated, the valve piston can be displaced hydraulically in both directions of movement. By movement in one direction, the control element is lifted off from the cam. In this position of the control element and of the valve piston the motor turns with the maximum speed provided. Movement of the valve piston in the other direction is possible only until the control element comes against the cam and is then determined by the shape of the cam as long as the valve piston is subjected to a force acting in the corresponding direction. If the control element lies against the cam in a region in which the latter is at a constant distance from the axis of the motor shaft then the valve piston remains at rest. In a region in which the distance of the cam from the axis of the motor shaft is reduced, the valve piston moves in the direction of the force acting on it. In positions of the valve piston in which the latter rests via the control element against the cam, a throttle is connected on the discharge side in the hydraulic circuit, the throttling action of which is dependent within a limited region on the position of the valve piston. The motor now moves at creep feed in order to reach the selected position. When the selected position is reached, the control element falls into an indentation in the cam which is associated one or more positions of the machine part, and the valve piston enters into a position in which the hydraulic motor is no longer supplied with pressurized fluid.

In the positioning drive known from Federal Republic of Germany AS 23 49 099 and in the positioning drive described in the senior German Patent Application P 43 12 581.6, the action of the throttle cannot be adjusted. In the positioning drive known from the Japanese utility model application, the lock nut screwed onto the section of the valve piston provided with an external thread can be loosened and the valve piston and the setting element displaced axially with respect to each other by rotating these two parts with respect to each other. In this way, the relative position is changed between the valve piston and the control element so that the action of the throttle is changed for a given position of the control element. In this way, the drive can be adapted to different circumstances upon different cases of use. In the case of the known positioning drive, the lock nut is located within a cavity in the housing into which the valve piston extends, which is filled with hydraulic oil upon operation and has, in the extension of the valve piston, an opening which is closed by a closure screw. In order to loosen the lock nut, it is therefore necessary to remove the closure screw. Upon removal of the closure screw, oil flows out of the cavity unless the oil level has been previously lowered. Finally, after an adjustment and after the closure screw has been screwed on, the motor must be vented.

SUMMARY OF THE INVENTION

The object of the present invention is so to improve a positioning drive of the introductory-mentioned type wherein the adjustment of the valve piston with respect to the control element can be effected in a simple manner in substantially less time.

This object is achieved in such a positioning drive in the manner that the outer one of the two parts which are coaxial to each other, namely the valve piston or the setting element, is guided outward through the housing of the structural unit comprising the control valve and the hydraulic motor, and that the securing element, for instance a lock nut, is accessible from outside the housing. Accessible from outside the housing does not mean, in this connection, that the securing element is located outside of the outer contour of the housing. It merely means that it is not necessary to open the housing in order to reach the securing element. There is conceivable in this connection, for instance, a construction in which the securing element is located within the outer one of the two parts, valve piston and setting element, and within the outer contour of the housing but that it is readily accessible from the outside, for instance through the outwardly extended bar which is provided with an axial passage.

As already indicated, it is basically sufficient if the outer one of the two parts, valve piston and setting member, is conducted outward out of the housing. In the case of a construction in accordance with the Japanese utility model application, this would be the bushing-like setting member. The length of the valve piston need not be changed. As securing element there can be used, for instance, a lock screw which is screwed so far from the outside into the bushing-like setting element that it lies tightly against the valve piston. In this connection, a short locking screw which does not extend beyond the setting element and which is provided with an internal socket or a slot in order for a tool to act on it is sufficient. The securing element is, however, more easily accessible if a positioning drive in accordance with the invention is further developed, in addition to the outer of the two parts the inner of the two parts, valve piston and setting element, is also conducted outward, the inner part protruding beyond the outer part and the securing element being a threaded nut threaded on the inner part.

In order that no oil can leak out in the region of the housing in which the valve piston and/or the setting element are guided out of the housing, the positioning drive is sealed in a manner.

If the control element is arranged on a first end of the valve piston, then an adjustment is possible from the other end of the valve piston by a development wherein, the second end of the valve piston extends out of the structural unit and has a continuous axial bore. The adjustment element is contained, as adjustment rod, in the axial bore of the valve piston. Furthermore, a screw joint between adjustment element and valve piston is formed by an external thread on the adjustment rod and an internal thread on the valve piston. By turning the valve piston with respect to the adjustment rod, the relative position between valve piston and control element is changed. The adjustment rod advantageously extends by an externally threaded section by which it engages beyond the valve piston into the internal thread of the valve piston. A lock nut is then screwed on this externally threaded section in order to secure the position of adjustment rod and valve piston with respect to each other. Therefore, there are not present separate externally threaded sections on the adjustment rod for the valve piston and the lock nut.

A development is particularly advantageous when the control element is arranged as a control bolt in the extension of the valve piston. The adjustment rod is advantageously also developed then as a separate structural part and fastened on the control bolt, in particular screwed to the control bolt. If the control bolt, which is arranged in the extension of the valve piston, is guided, secured against rotation, in the housing, no separate direct anti-turning means is necessary between the adjustment rod and the housing if the adjustment rod, in accordance with claim 7, is connected in a manner secured against rotation to the control bolt.

In accordance with a feature of the invention, two fluid connections of the structural unit can be connected together via the axial bore of the valve piston. The axial bore therefore fulfills a two-fold function. On the one hand, it receives the adjustment rod and, on the other hand, it is part of a possible fluid communication between two connections. In this way, it may be possible to dispense, as compared with a known or previously described positioning drive, with one or more housing bores or to enlarge the cross section of passage between the two fluid connections of the structural unit. Since the dispensing with housing bores or the enlarging of the cross section of flow through an axial bore in the valve piston is also possible when the valve piston is not adjustable with respect to the control element, the feature set forth in the first sentence of this paragraph can be used to advantage also in a positioning drive which does not have the previously-mentioned features. The use of the axial bore as part of a communication between two fluid connections is also particularly favorable especially when the axial bore is open axially to a chamber of the housing which is connected with a first fluid connection. In such case, namely, only a single further transverse bore in the valve piston is necessary in order to be able to use the axial bore as part of the communication between two fluid connections.

BRIEF DESCRIPTION OF THE DRAWINGS

Two illustrative embodiments of a positioning drive in accordance with the invention are shown in the drawings. The invention will now be explained in further detail with reference to the figures of the drawing, in which.

DETAILED DESCRIPTION OF THE PREFERRED EMBODIMENTS

Figure 1:
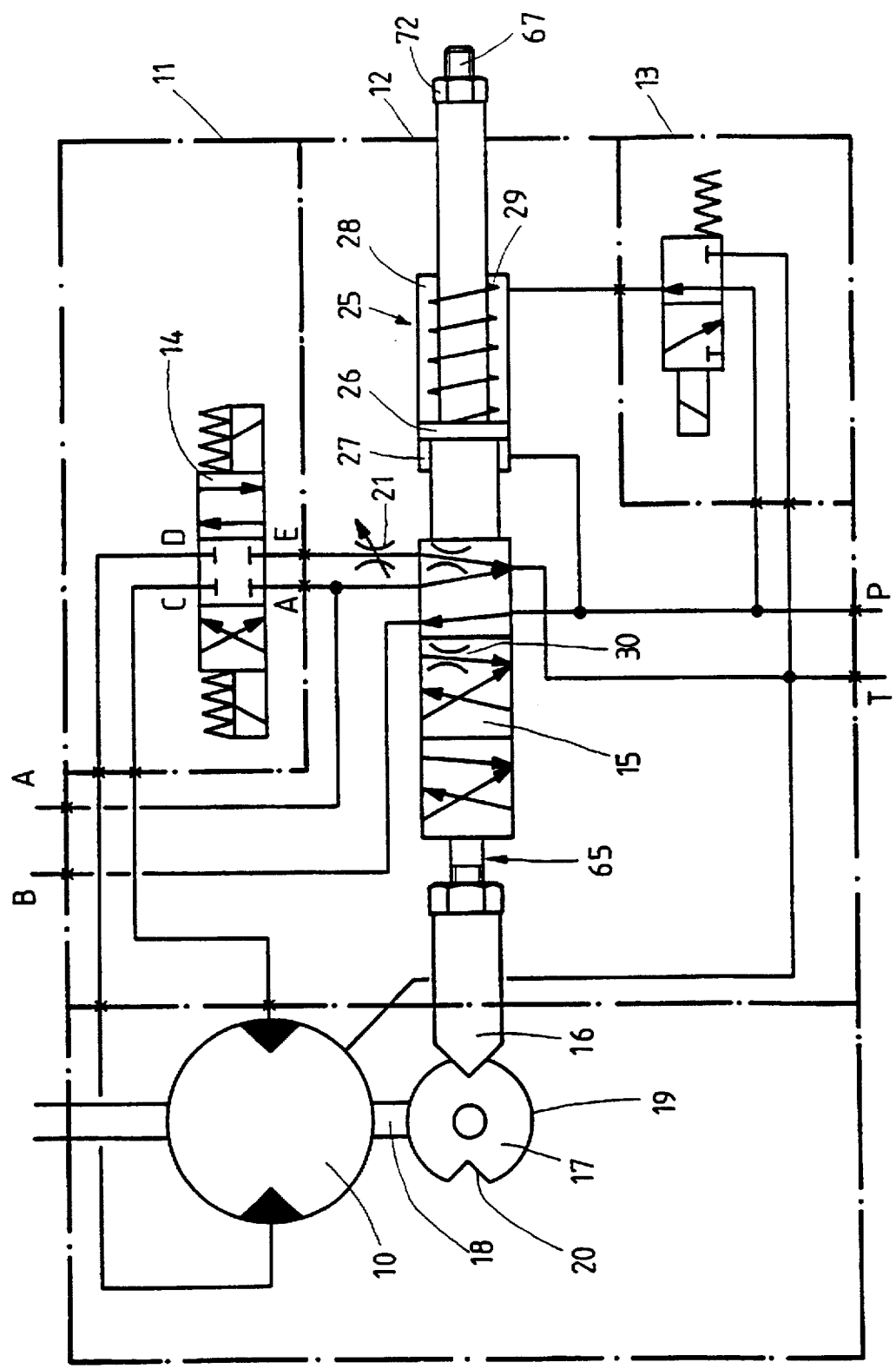
FIG. 1 diagrammatically shows the first embodiment.

The positioning drive of FIGS. 1 to 5 comprises a hydraulic motor 10, which produces a high torque at low speed, a direction of rotation valve 11, a control valve 12, and a 3/2-way starting valve 13. The direction-of-rotation valve 11 is a 4/3-way valve, the valve piston 14 of which is spring-centered and can be moved electromagnetically. In the central position of rest of the valve piston 14, the outlets C and D of the direction-of-rotation valve 11 which are connected to the hydraulic motor 10 are separated from two inlets A and E. In the two working positions, the inlets are connected alternately with the outlets. The control valve 12, which has a valve piston 15, has an inlet T which is connected with a pressurized-fluid storage container and an inlet P which is connected with the delivery side of a hydraulic pump. Two outlets of the control valve 12 correspond to the two inlets A and E of the direction-of-rotation valve; an outlet designated B of the control valve 12 is an external connection of the positioning drive. The outlet A is also guided as external connection on the outside of the positioning drive.

In the connection between the one outlet of the control valve 12 and the inlet E of the direction-of-rotation valve 11 a displaceable throttle 21 is arranged by which a maximum speed of the hydraulic motor 10 can be set.

The longitudinal axis of a control bolt 16 coincides with the longitudinal axis of the valve piston 15. Valve piston 15 and control bolt 16 are together arranged and movable radial to a cam disk 17, the cam disk being seated, fixed for rotation, on the motor shaft 18 of the hydraulic motor 10. The control bolt 16 cooperates with a cam 19 formed by a corresponding shape of the outer circumference of the cam disk 17, the cam having two diametrically opposite detent notches 20 and the same constant distance from the axis of the motor shaft in the two regions between the two detent notches.

The control valve 12 has a control chamber 25 which the valve piston 15 divides by an outer collar 26 into two annular chambers 27 and 28 of differently larger annular surfaces. The smaller annular surface of the outer collar 26, and thus the smaller annular space 27, is located, seen from the control block 16, on this side of the outer collar 26 and the larger annular surface, and thus the larger annular space 28, on the other side of the outer collar 26. The annular space 27 is continuously connected to the inlet P of the control valve 12. The annular space 28 is connected to the starting valve 13 and in the rest position of the latter is connected to the pressure inlet P while in the working position thereof it can be relieved via the inlet T of the control valve 12 to the pressurized-fluid storage container. Within the annular space 28 there is furthermore arranged a coil compression spring 29 which urges the valve piston and the control bolt 16 in the direction towards the cam 19.

In the position shown in FIG. 1, the control bolt 16 engages, under the action of the spring 29, into a detent notch 20 in the cam 19. If pressure is present at the inlet P, then the same pressure to be sure prevails in the annular spaces 27 and 28. Due to the difference in size of the annular surfaces, the control bolt, however, is urged into the detent notch not only by the spring force 29 but also by a hydraulic force. The inlet P of the control valve 12 is connected to the outlet B and the inlet T is connected to the outlet A. When pressure is present in the inlet P, a hydraulic cylinder connected to the outlets A and B can therefore be actuated. In order to permit the hydraulic motor 10 to operate, the starting valve 13 is first of all connected. As a result, the annular space 28 is relieved of load while the pressure in line P prevails in the annular space 27. The force produced by this pressure on the annular surface of the outer collar 26 facing the annular chamber 27 overcomes the force of the spring 29 and pushes the valve piston 15 radially outward with respect to the cam disk 17 until it strikes a stop which is so arranged that the control bolt 16 is now spaced from the cam disk 17. In this position of the valve piston 15, the outlet B of the control valve 12 is connected, unthrottled, with the inlet T. If one disregards the throttle 21, the outlet E is also connected unthrottled with the inlet T. The outlet A is connected with the inlet P. If the direction-of-rotation valve 11 is now switched, the hydraulic motor 10 begins to turn. Shortly before a further detent notch 20 of the cam disk 17, selected in accordance with the position of the machine part to be established, comes in front of the control bolt 16, the starting valve switches back into its position of rest so that the annular space 28 is acted on by the same pressure as the annular space 27. Due to the larger annular surface of the annular space 28, the control bolt 16 and the valve piston 15 are moved radially inwards towards the cam disk 17 until the control bolt 16 comes against a section of the cam 19 which is present between two detent notches. In this position, the same outlets and inlets of the of the control valve 12 are connected to each other as in the previously described position of the valve piston 15. A throttle place 30 is merely connected between the inlet T and the outlet E and therefore in the discharge of the hydraulic oil. The hydraulic motor 10 now turns further with slower speed until the control bolt 16 can snap into the next detent notch 20 and both motor lines are connected to the tank.

Figure 2:
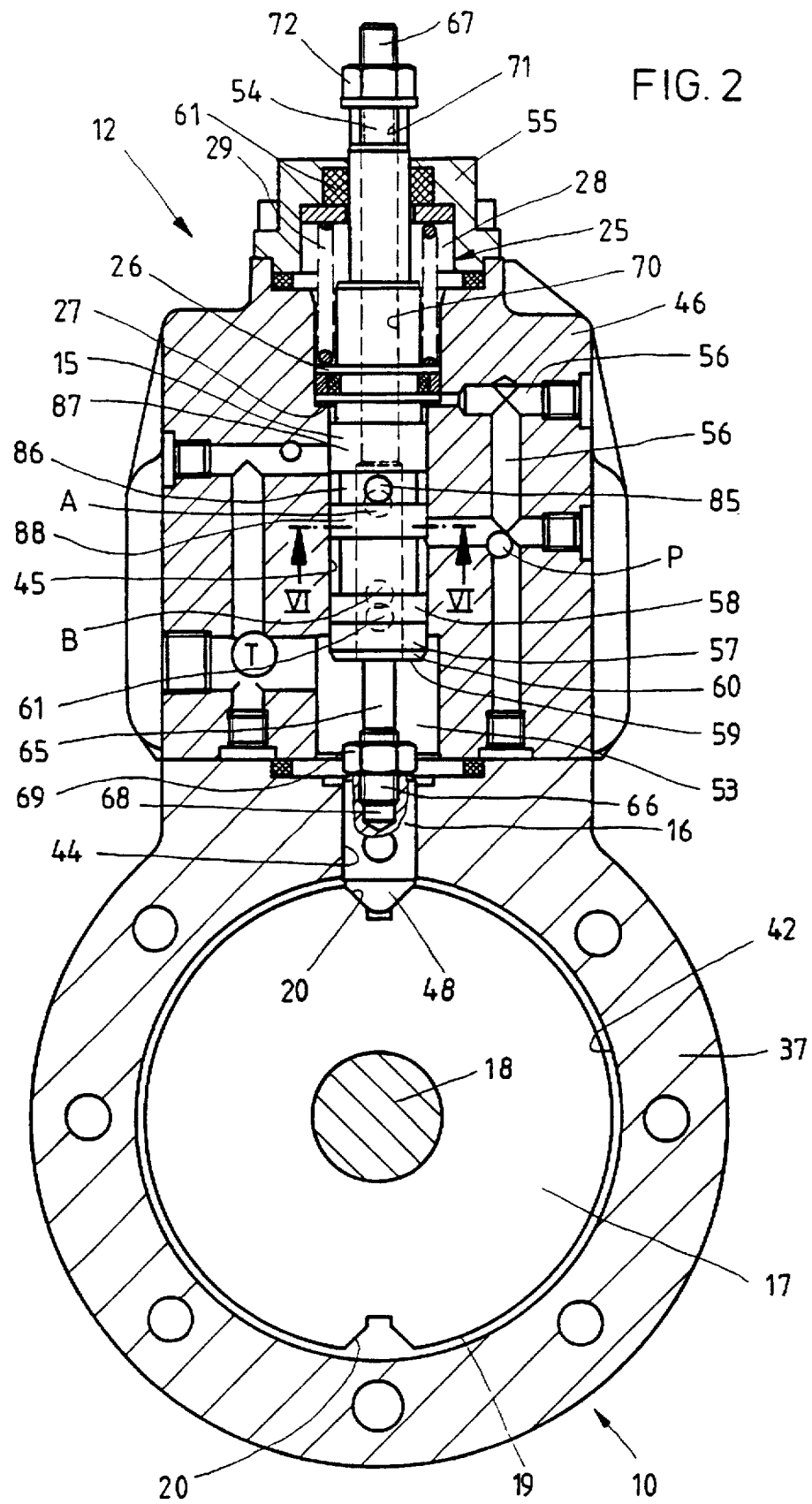
FIG. 2 is a section through the first embodiment perpendicular to the motor shaft and in the axis of the valve piston.
Figure 3:
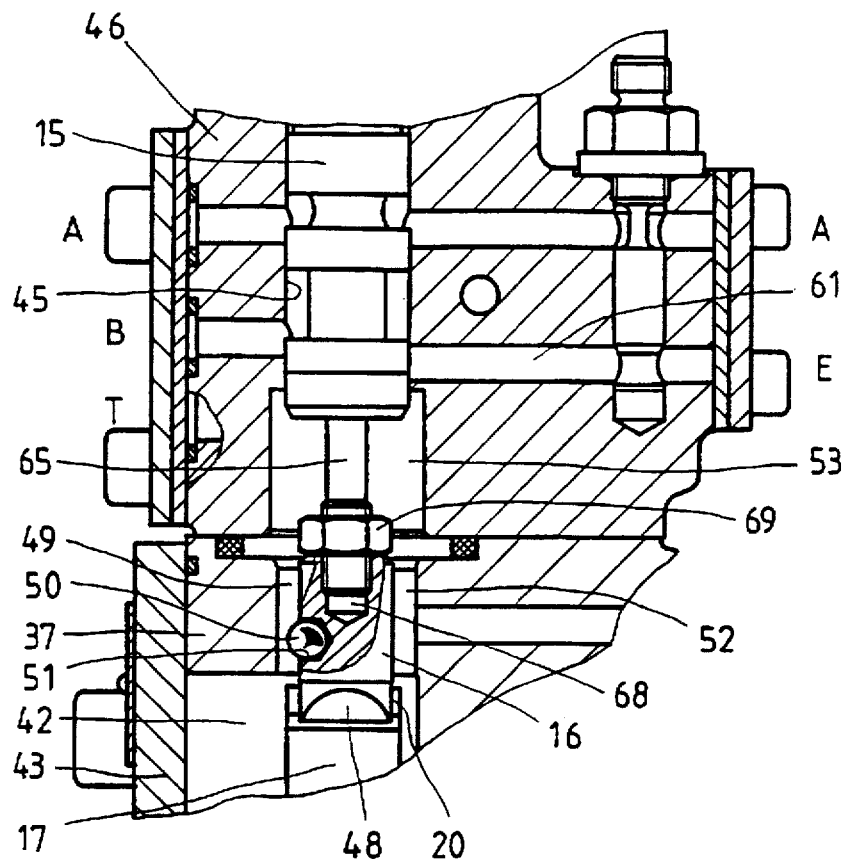
FIG. 3 is a partial section through the first embodiment in the region of the control piston and perpendicular to the sectional view of FIG. 2.
Figure 4:
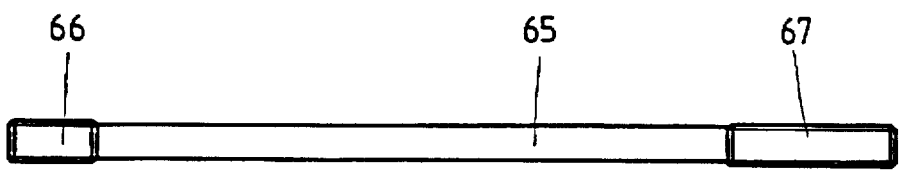
FIG. 4 is a view of the adjustment element of FIGS. 2 and 3, developed as adjustment rod.
Figure 5:
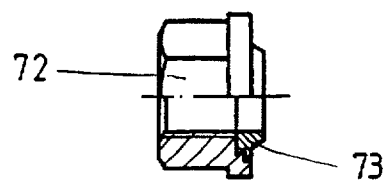
FIG. 5 shows the lock nut, visible in FIGS. 2 and 3, between valve piston and adjustment element.
Figure 6:
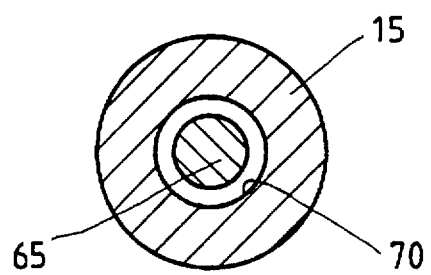
FIG. 6 shows, on a larger scale, a section through the valve piston along the line VI—VI of FIG. 2.

In FIG. 2 there can be noted the motor shaft 18 which, in a manner not shown, is rotatably supported on two sections spaced from each other by in each case a plain bearing within a multipartite motor housing 37.

The motor shaft 18 extends into a chamber 42 of the motor housing 37 which is closed by a cover 43 and in which the cam disk 17, which is seated fixed for rotation on the motor shaft 18, is located, which cam disk has the cam 19 with the two detent notches 20 already shown in FIG. 1. In the region of the cam disk 17, a bore extending radially through the motor housing 37 debouches into the chamber 42, the bore continuing outside of the motor housing in a valve bore 45 which is located in a valve housing 46 of the control valve 12 built onto the motor housing 37 and the axis of which coincides with the axis of the bore 44. This axis extends radially to the axis of the motor shaft 18 and of the cam disk 17.

The control bolt 16 is guided in the bore 44 and the valve piston 15 is guided in the valve bore 45, the control bolt 16 and the valve piston 15 being produced as separate parts. The end 48 of the control bolt which faces the cam disk 17 is made of wedge shape, the vertex line of the wedge extending parallel to the motor shaft. In order that the vertex line always retains this direction, the control bolt 16 is secured against rotation. For this purpose, the bore 44 is provided with a longitudinal groove 49 into which there engages a ball 50 which is contained within a recess 51 in the control bolt 16. Diametrically opposite the longitudinal groove 49 and in a plane passing through the axis of the control bolt 16 and the axis of the cam disk 17, a second longitudinal groove 52 extends along the bore 44, whereby an open communication is produced between the chamber 42 and a valve chamber 53 immediately adjacent the motor housing 37, within the valve bore 45. This valve chamber 53 is connected with the inlet T of the control valve 12. The control space 25 is located, seen from the valve chamber 53, on the other side of a narrower section of the valve bore 45 within the housing 54 of the control valve 12 and is closed towards the outside by a cover 55 which is placed on the valve housing 46. Within the control space there can be noted the compression spring 29 and the outer collar 26 of the valve piston 15.

The valve piston 15 is guided outward through the cover 55 and is provided, outside the valve housing 46 to which the cover 55 also belongs, with a dihedral 54. The passage is sealed by a packing ring 61 which is arranged in a pocket in the cover 55 between the latter and valve piston 15.

The connections P, T, A, B and E on the valve housing 46 of the control valve 12 are so bored through with the valve bore 45 that the connections discussed when explaining FIG. 1 can be produced with the valve in the individual switched positions of the valve piston 15. From FIG. 2 it can also be noted, in particular, that the valve chamber 53 is connected with the connection T and that the annular space 27 is connected continuously with the connection P via two bore holes 56.

In the region of the transition from the valve chamber 53 to the narrower section of the valve bore 45, the valve piston 15 has two annular collars 57 and 58 which directly adjoin each other. The inner annular collar 58 has a diameter which corresponds to the diameter of the narrower section of the valve bore 45. The annular collar 57 is slightly smaller in diameter than the annular collar 58. It ends with a bevel 60 at the end 59 facing away from the annular collar 58.

The control bolt 16 and the valve piston 15 are rigidly attached to each other by an adjustment rod 65 which is provided on each of its two ends with a threaded section 66 and 67 respectively. By the threaded section 66 it is screwed into a central, axial threaded bore 68 made in the control bolt 16 from the end facing the valve piston 15. The connection between the adjustment rod 65 and the control bolt 16 is secured by a lock nut 69.

Centrally through the entire valve piston 15 there extends an axial bore 70 through which the adjustment rod 65 extends from the control bolt 16 to the other side of the valve piston 15, so that it protrudes outside the valve housing 46 over the valve piston 15. Its threaded section 67 is located in part within the valve piston 15 and engages there into an internal thread 71 of the valve piston 15. On the protruding part of the threaded section 67 of the adjustment rod 65 there is threaded a lock nut 72 which rests axially firmly against the valve piston 15 and locks the adjustment rod 65 and the valve piston 15 in their position with respect to each other. The lock nut 72 is a collar nut in which a packing ring 73 is arranged, as can be noted more clearly from FIG. 5. Upon the tightening of the lock nut, this packing ring presses against the adjustment rod 65 and the valve piston 15 so that no hydraulic oil can pass outwards via the axial bore 70 of the valve piston 15 between the interengaging threaded sections 67 and 71.

The throttle point 30 between the connections T and E of the control valve 12 is formed in the manner that the bore 61 in the valve housing 46 is not entirely covered by the annular collar 57, and therefore the end 59 of the annular collar 57 is located axially within the bore 61 when the control bolt rests on the cam 19 outside of the detent notch 70. The size of the surface in which the annular collar 57 leaves the bolt 61 free can now be changed by changing the distance between the control bore 16 and the valve piston 15. For this purpose, the lock nut 72, which is readily accessible outside of the housing, is loosened. Thereupon, a tool is placed on the dihedral 54 of the valve piston 15 and the valve piston turned with respect to the adjustment rod 65. The latter does not also turn since, on the one hand, it is connected in unturnable manner with the control bolt 16 and since, on the other hand, the control bolt 16 is secured against turning with respect to the motor housing 37 by the balls 50. By the turning of the valve piston 15 with respect to the adjustment rod 65, the distance between the control bolt 16 and the valve piston 15 is changed, and thus the size of the opening cross section of the throttle 30. Upon the movement of the control bolt 16 into a detent notch 20, the end 59 of the valve piston 15 passes, as can be noted from FIG. 2, out of the region of the bore 61 so that now only the annular slot between the annular collar 27 and the bore 45 determines the throttle cross section. This cross section is independent of the previous adjustment. The bevel 60 smooths the transition between different throttle cross sections. It can be seen that, with a positioning drive in accordance with the invention, the opening cross section of the throttle 30 which is active when the control bolt 16 lies on the cam 19 outside of a detent notch 20 can be adjusted very easily. No intervention in the valve housing 46 is necessary. No oil leaks out. Venting is avoided.

Figure 7:
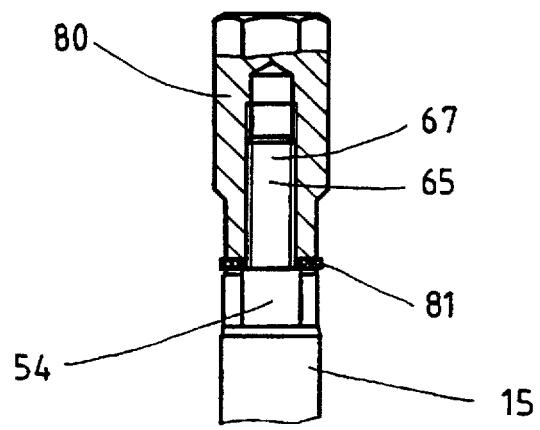
FIG. 7 shows a portion of the valve piston of a second embodiment having a cap nut as lock nut between adjustment rod and valve piston.

In the embodiment of FIG. 7, in which there can be noted the valve piston 15 of a control valve 12 and the adjustment rod 65 with its threaded section 67, a cap nut 80 is used to fasten the valve piston 15 and the adjustment rod 65 to each other instead of the collar nut 47 of the embodiment shown in FIGS. 2 to 6. The cap nut 80 is screwed onto the threaded section 67 of the adjustment rod 65 and clamps a packing ring 81 axially between itself and the valve piston 15. Due to the use of a cap nut, this packing ring need not also rest against the adjustment rod 65. Furthermore, the adjustment of the valve piston 15 with respect to a control piston is effected, in the embodiment of FIG. 7, in the same way as in the embodiment of FIGS. 2 to 6. The cap nut 80 is first of all loosened and then, by action on the dihedral 54 of the valve piston 15, the latter is turned with respect to the adjustment rod 65. The cap nut 80 is then again tightened.

In both embodiments, the axial bore 70 in the valve piston 15 can at the same time be used in order to produce, via the axial bore, communication between two connections of the control valve 12. For this purpose, the valve piston 15 is furthermore provided with two transverse bores 85 which are diametrically opposite each other and are present in a piston neck 86 which is limited on the one side by a piston collar 87 which permanently separates the annular space 27 from the tank connection T and, on the other side, by a piston collar 88 which controls the connection of the connection A with the pressure connection P and the tank connection T and the connection of the connection B with the pressure connection P. Via the transverse bore 85 and the section of the axial bore 70 present between the transverse bore 85 and the end 59, the connection A can be connected to the tank connection T. For this purpose, the axial bore 70 has a larger diameter in said section than in the section between the transverse bore 85 and the end protruding from the housing 46.

We claim:

1. A positioning drive, comprising a hydraulic motor (10) which has a cam disk (17) which is rotatable with a motor shaft (18) and is provided with a cam (19), a control valve (12) with which the hydraulic motor (10) forms a structural unit with a housing (37, 46) and has a valve piston (15) which is displaceable between several positions, a control element (16) via which the valve piston (15) can rest against the cam disk (17), and an adjustment element (65) which is operatively arranged between the control element (16) and the valve piston (15) and coaxial to the valve piston (15), and wherein by relative displacement of said adjustment element with respect to the valve piston (15), the relative position between said valve piston (15) and said control element (16) is variable and the position of said adjustment element with respect to the valve piston (15) secured by a releasable locking element (72, 80), and wherein an outer part of the two parts, valve piston (15) and adjustment element (65), is guided outwardly through the housing (46), and the locking element (72, 80) is accessible from outside the housing (46).

2. A positioning drive according to claim 1, wherein an inner part (65) of the two parts, valve piston (15) and adjustment element (65), is guided outwardly through the outer part, and the inner part (65) protrudes beyond the outer part; and the securing element is a threaded nut (72, 80) which is screwed onto the inner part (65).

3. A positioning drive according to claim 1, wherein a first packing (61) is present between the housing (46) and the outward guided section of the outer part and the slot between the valve piston (15) and the adjustment element (65) is sealed from the outside by a second packing (73,81).

4. A positioning drive according to claim 1, wherein the control element (16) is arranged on a first end of the valve piston (15); at its other, second end, the valve piston (15) extends out of the structural unit (10, 12) and has a continuous axial bore (70); the adjustment element is an adjustment rod (65) and is contained within the axial bore (70); and a threaded joint is formed between said adjustment rod (65) and said valve piston (15) by an external thread (67) on the adjustment rod (65) and an internal thread (71) on the valve piston (15).

5. A positioning drive according to claim 4, wherein said externally threaded section (67) protrudes beyond the valve piston (15), and a lock nut (72,80) is screwed on said externally threaded section (67).

6. A positioning drive according to claim 4, wherein the control element is arranged as a control bolt (16) in the extension of the valve piston (15), and the adjustment rod (65) is fastened as a separate part on the control bolt (16).

7. A positioning drive according to claim 4, wherein the control element is arranged as a control bolt (16) in the extension of the valve piston (15) and is guided, secured against rotation, in the housing (37), and the adjustment rod (65) is connected, secured in rotation, to the control bolt (16).

8. A positioning drive, in particular according to claim 4, wherein two fluid connections (A, T) of the structural unit (10, 12) can be connected to each other via the axial bore (70) of the valve piston (15).

9. A positioning drive according to claim 8, wherein the axial bore (70) is open axially towards a chamber (53) of the housing (37, 46) which chamber is connected with a first fluid connection (T), and the valve piston (15) has a transverse bore (85) which debouches into the axial bore (70) and is connectable to a second fluid connection (A).

* * * * *